Nov. 26, 1963 R. W. HENNING 3,111,673
EXPLOSIVE ACTUATED AXIAL IMPACT FASTENER SETTING TOOL
Filed April 12, 1960 6 Sheets-Sheet 3
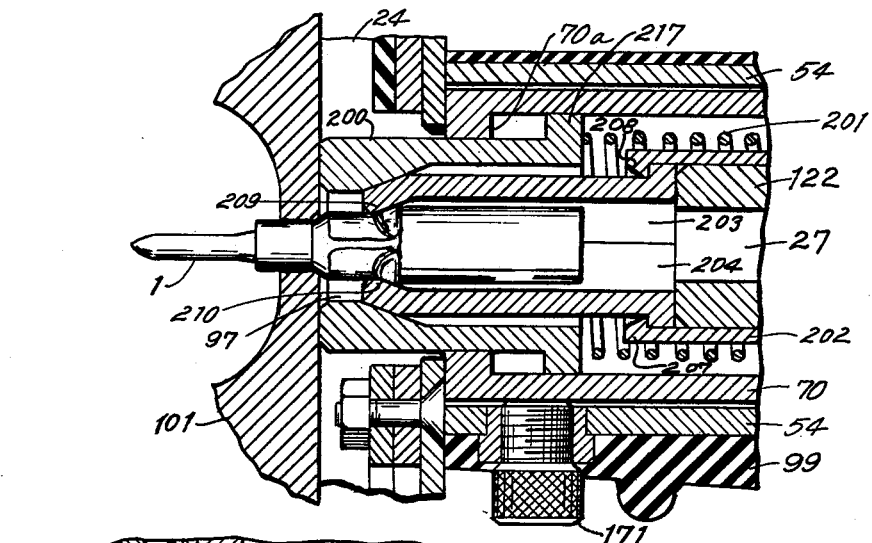
FIG.6
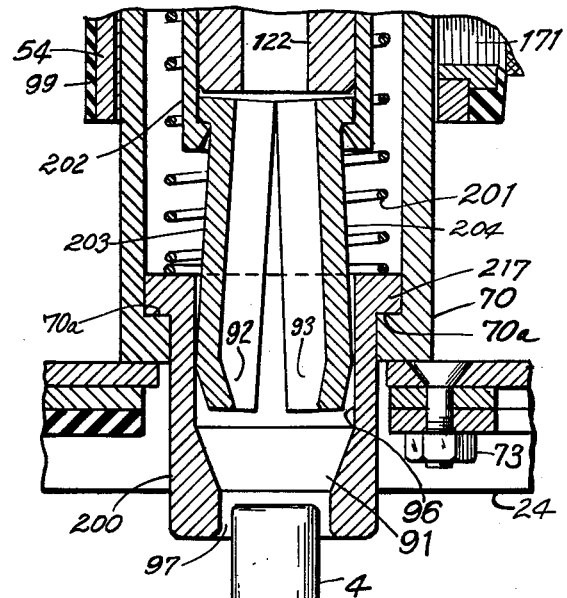
FIG.7
INVENTOR:
ROBERT W. HENNING
BY 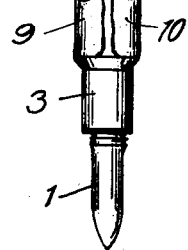
ATTORNEY Nov. 26, 1963  R. W. HENNING  3,111,673
EXPLOSIVE ACTUATED AXIAL IMPACT FASTENER SETTING TOOL
Filed April 12, 1960  6 Sheets-Sheet 4

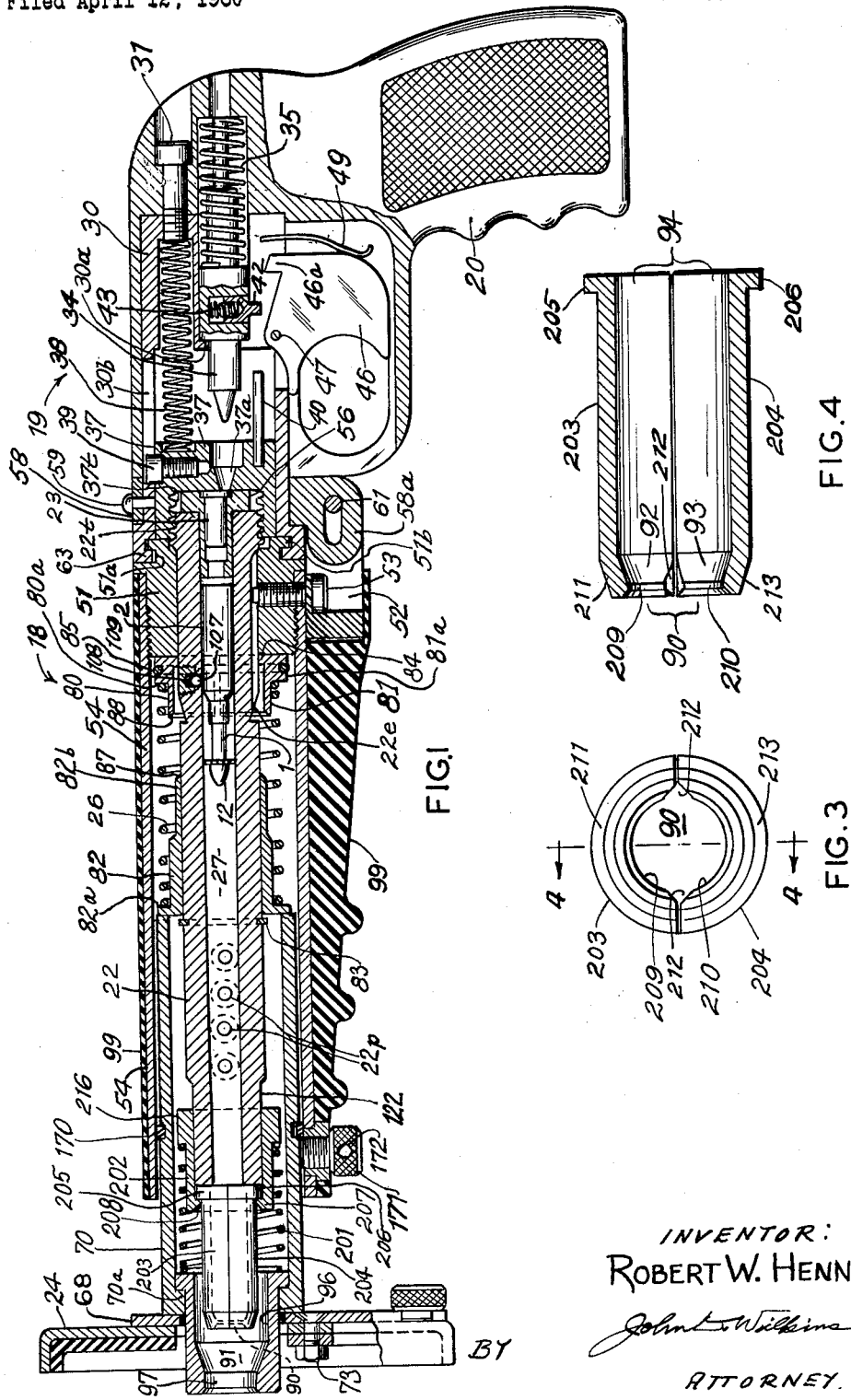

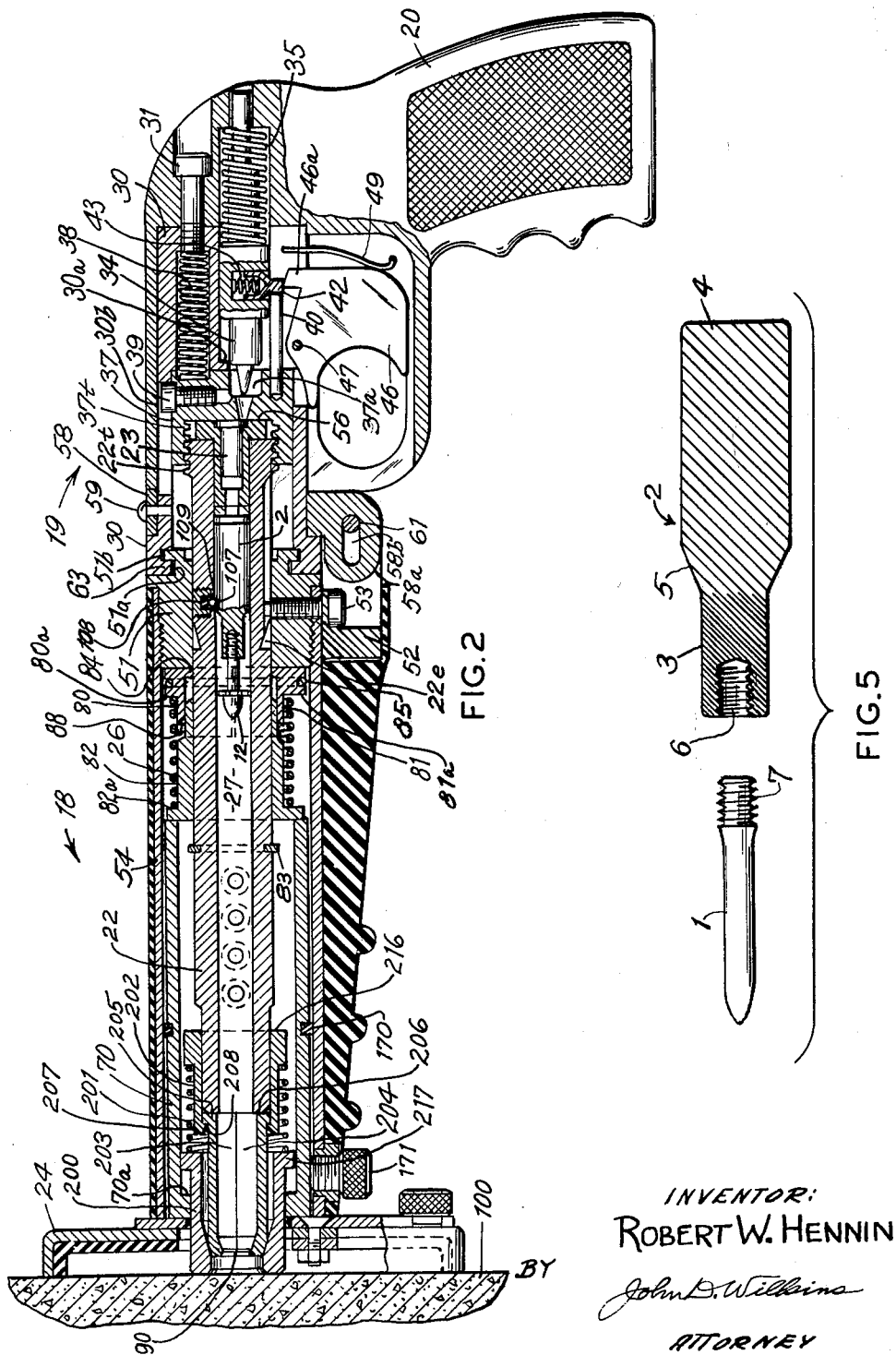

INVENTOR:
ROBERT W. HENNING
BY John D. Wilkins
ATTORNEY.

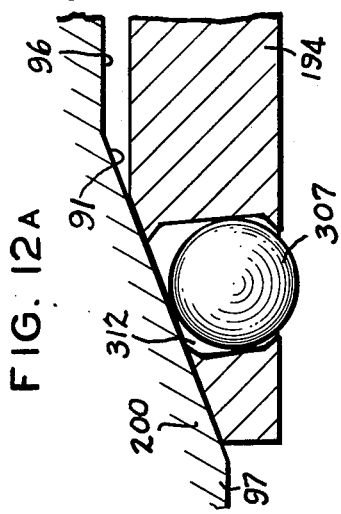
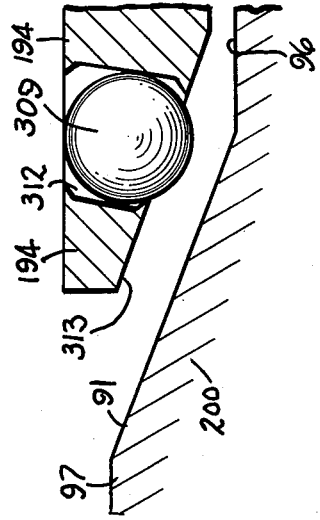
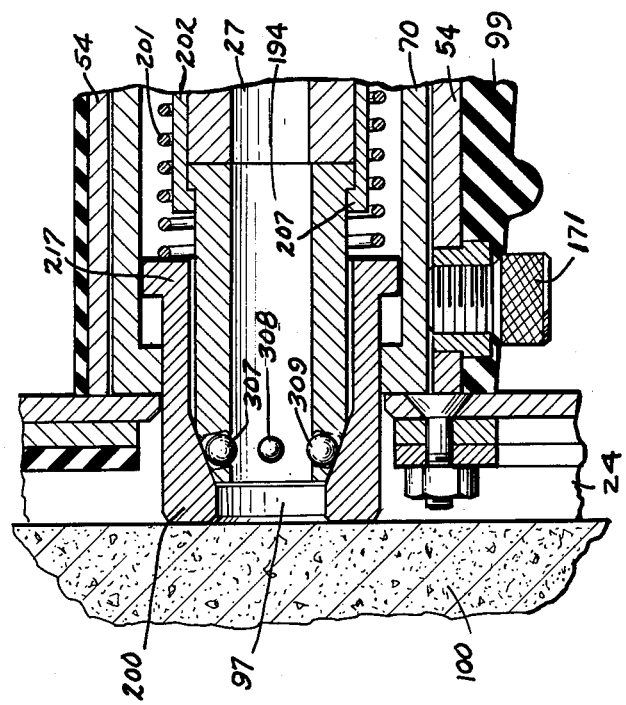
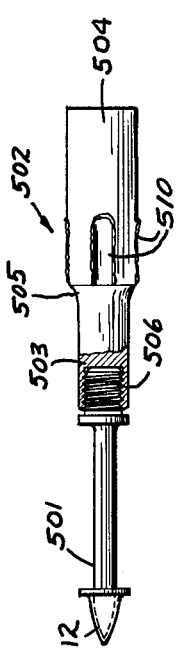

3,111,673
EXPLOSIVE ACTUATED AXIAL IMPACT
FASTENER SETTING TOOL
Robert W. Henning, North Haven, Conn., assignor to Olin Mathieson Chemical Corporation, New Haven, Conn., a corporation of Virginia
Filed Apr. 12, 1960, Ser. No. 21,722
25 Claims. (Cl. 1—44.5)

This invention relates to improvements in a power-actuated fastener driving tool and more particularly to a powder-actuated tool having an arresting arrangement to restrain the projected fastener against free flight.

Tools of the explosive operated type have been developed to sink a fastener such as a stud, pin, or the like into steel, wood or materials of suitable character and have found wide application in many fields such as the construction industry and in the maintenance field. Although such tools, like any other tool, are quite safe when properly employed, especially when such tools include one or more safety features, there has always been a need for an ultimate in safety provisions for these types of tools where the most improbable, and the least favorable operating conditions are encountered, no matter how rarely. A tool with a factor of safety against any foreseeable possibility of allowing a fastener to escape into free flight will extend the use of such tools without limitation into areas of operation where their introduction would be welcome, but which have been heretofore closed, provided the super-added safety does not interfere excessively with routine fastening. The present invention provides exactly such a tool in accordance with an entirely new concept in safety operation without impairment of ease of operation.

One of the objects of the present invention is to provide a powder-actuated tool including a drivable unit wherein a fastener driven thereby cannot escape into free flight in the event that unexpected ease of penetration into parts to be fastened together is encountered either because of an unforeseeable variation in the character of the material of the work surface or because of an inadvertent excess of powder.

Another object is to provide an explosive operated tool of any suitable stud driving type wherein the fastener remains free for projection into the work surface for fastening purposes, but is automatically and dependably rendered captive when there is danger of overpenetration.

Another object is to provide a tool so arranged and functioning for safety purposes as to be adapted to check the passage of the fastener only in the event that the emergence of the fastener from the muzzle zone of the tool proceeds beyond a certain predetermined position.

Another object is to provide the tool with a new and an improved automatic safety arrangement which will permit the tool to be reinstated quickly for continued operation and will not require disassembly following an occasional emergency because it does not put the tool into so abnormal a condition when the safety parts go into operation as to require a subsequent disassembly operation to return the tool to a normal operating condition.

Still another object is to provide a tool of improved safety having no expendable safety parts requiring replacement in the event the safety is called into emergency operation before the tool can be put back into routine operation and wherein the replacement is of the easiest type of a part independently of the tool assembly and obviating any long delay because of need of an overhauling of the tool preparatory to subsequent routine operation.

A still further object is to provide such a tool wherein operation is automatically prevented in the event that the operator inadvertently omits utilization of the safety elements.

Still another object is to provide such a tool wherein overdriving because of overpenetration is prevented within tolerable limits so as to avoid an oversensitivity to normally encountered variations in dimensions and resistances to penetration.

Still another object is to provide a built-in automatic safety responsive only upon occurrence of a clear-cut emergency, but not hampering otherwise routine operation excessively.

A further object is to provide an emergency fastener braking device reliable and quick acting, but of a sufficiently gradual decelerating character so as not to damage any part of the tool and thereby give rise to excessive tool maintenance.

A further object of the present invention is to provide a powder-actuated tool with an abutment arrangement which is inertia-operated for actually seizing a fastener on the verge of going too far beyond a predetermined distance from the muzzle of the tool.

A still further object of the present invention is to provide such a tool with an abutment arrangement movable to an operative position to allow the fast flight of a drivable unit such as a fastener in, but not out of the tool when the tool is put into firing position, but which is movable to a position for easily releasing the unit, after captivation on the verge of free flight, without offering interference of any kind, unless the driving proceeds improperly.

A still further object of the present invention is to provide a tool characterized by speed and ease of operation with respect to the feeding of fasteners to the tool driving, and disengagement of the tool from the fasteners without requiring any special auxiliary devices forming a part of the tool and requiring time consuming extra steps of fastener seating and extrication with respect to the tool.

A still further object is to provide a tool wherein different types of auxiliary safety fixtures may be readily interchanged while preserving the other safety aspects of the tool.

Still another object is an arrangement of parts in a way permitting easy inspection to ascertain visually and readily that the tool is in proper functioning condition.

Other objects and advantages of this invention, such as the relatively simple structure and design of the safety arrangement and of its parts for carrying out their functions in accordance with this invention will be apparent from the drawing and description of the specific embodiment as illustrated in the accompanying drawing wherein:

FIG. 1 is a longitudinal cross sectional view showing an explosive actuated fastener driving tool with the safety fixture of this invention mounted thereon and showing the tool barrel loaded;

FIG. 2 is a longitudinal cross sectional view showing the tool of FIGURE 1 with its muzzle, or front end, thrust against the surface of a workpiece so that the tool is ready for driving the fastener;

FIG. 3 is a front view in elevation showing the safety jaws in enlargement;

FIG. 4 is a side sectional view taken on line 4—4 of FIGURE 3;

FIG. 5 is a side view partly in cross section showing an enlargement of a fastener and the braking piston in disassembly;

FIG. 6 is a fragmentary view similar to FIGURE 2, but showing part of the tool adjacent the muzzle in cross section as in FIGURE 2 during the driving operation and how an overdriven fastener is stopped;

FIG. 7 is a fragmentary view of the tool parts of FIGURE 6 positioned as in FIGURE 1 showing the manner of pulling the main part of the tool from the fastener-brake assembly;

FIGURE 11 is a fragmentary side view in cross section comparable to FIGURE 6 and showing part of another embodiment of tool with modification adjacent the muzzle portion;

FIGURE 12A is semi-diagrammatic enlarged view showing details of the ball jaw construction of FIGURE 11;

FIGURE 12B is another semi-diargrammatic view showing how retraction of the balls occurs to clear the bore of the tool;

FIGURE 13 is a side view in partial cross section of another suitable fastener in drivable assembly with a braking cylinder deformed by the balls of the embodiment of FIGURE 11 to effect capture.

Figure 8:
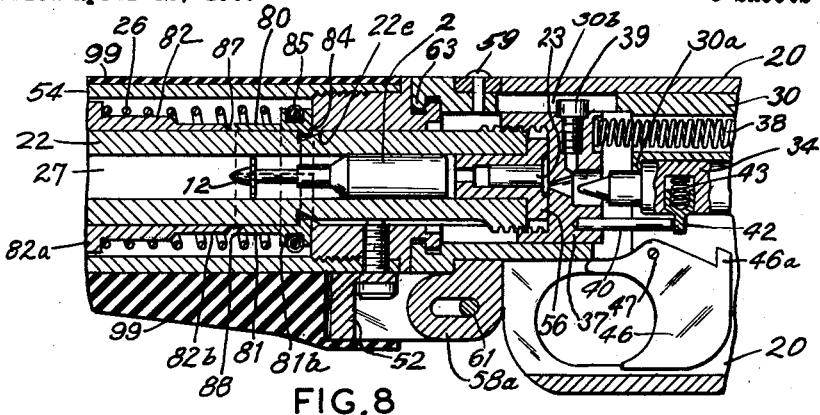
FIG. 8 is a fragmentary view adjacent the breech of the tool barrel showing part of the tool in cross section with the safety barrel lock of this invention in position for preventing tool operation when the safety shield and jaw carrying fixture is omitted, or its parts improperly installed.

In accordance with this invention, a high velocity type of explosively actuated driving tool is provided having a barrel with safety arrangement at the muzzle normally providing no interference to the passage of the driver and/or to the driven element, such as a driven fastener, but which is adapted for seizing any traveling parts in the barrel bore in the event of excessive overtravel whereupon locking of the traveling parts occurs by means of a special articulated jaw structure so that projection beyond the muzzle of the tool barrel is limited to avoid dangerous free flight, while the likelihood of damage to these tool parts is minimized by reason of their particular construction.

An important feature of this tool lies in the structure and arrangement of the parts for locking the explosive driven pieces which not only renders the parts more resistant to failure, but also permits the parts to be economically made, readily inspected and easily replaced, when inspection shows that any damage or excessive wear has ultimately occurred. The arrangement is such that the tool does not have to be taken apart to put it back in condition for normal operation in the event that over-penetration has occurred, because the excessive energy is absorbed in an expendable piston part in such a way as to preserve the main tool parts and allow the tool to be put back into service with the least interruption in its use. The arrangement floats to "give" and absorb shock.

This construction, which serves to stop the projected parts, takes the form of jaws mounted in a fixture. These are made according to this invention for association with a confiner which acts on the outside of them as close as possible to their action points where the stresses are taken care of and where the action and its results can be readily inspected. The confining and stopping arrangement involves jaw segments and two confining hoops, one at the front and the other at the rear of the segments. This jaw and confiner arrangement is characterized by interchangeability with various shield structures having different shapes to adapt each shield for a particular workpiece surface, different from other shapes of workpiece surfaces.

Another feature of this tool is the improved barrel lock for preventing operation of the tool not only in the absence of the aforementioned safety braking fixture, but also in the event the fixture is present with its parts improperly installed. This barrel locking feature is designed to seal its elements so as to reduce the accumulation of any products of combustion and is so arranged as to be self-cleaning because its parts are put into wiping relationship with each operation of the tool.

It is to be understood that this invention may take various forms adaptable to any one of a number of types of explosive actuated driving tools. The specific embodiment shown in FIGURE 1 is shown in connection with a tool of the type disclosed in co-pending application Serial No. 355,034, filed May 14, 1953, now U. S. Patent No. 2,945,236, granted July 19, 1960. This tool is characterized by a reciprocating relationship between the tool barrel and the tool housing as the tool is thrust against the work target surface for operability, by a parting arrangement for opening up the tool intermediate the ends of the tool for easy loading and spent cartridge extraction, and by the presence of various safety features, including particularly a control which prevents firing at an excessive angle to the workpiece surface to avoid ricocheting. Its barrel is ported at 22p.

The tool of FIGURE 1 is divisable by the parting arrangement into two major end portions, a front portion 18 and a rear breech assembly portion 19. The latter has a convenient pistol grip 20 and includes a rear housing 30 received in a recess and to which the grip is made fast by screw 31. The front portion 18 includes a front housing tube 54 carried threadedly, or in any other suitable way, on an outer tube collar 51 in movable connection at the parting arrangement with the rear housing such as by the circumferentially spaced bayonet lugs 63 of housing 30 fitting into mating grooves 51a behind corresponding lugs 51b of the collar 51, a barrel 22 having at its breech interrupted male threads 22t engageable with mating interrupted female threads 37t of a barrel breech block 37, which is slidably carried in the rear housing for coaction with the barrel for the purpose of both breech closure and control of tool operation.

Associated with the front portion 18 is a safety guard assembly including the shield 24 caried on the shield tube 70 with a forward bias with respect to the barrel by reason of not only the thrust of the barrel compression spring 26, but also the thrust of the retainer spring 201.

The two major portions, comprising a barrel assembly, constituting the front portion 18, and a breech assembly, constituting the rear portion 19, forming the left and the right ends of the tool, are connected by a hinge action to permit the tool to be opened and closed intermediate these ends at the hinge bracket 52 fixed on collar 51 and tube 54 by guide screw 53 and having two ears. These are pierced to carry the transverse hinge pin 61 about which there is a limited longitudinal motion permitted by slots 58b made in an axial direction in the pair of ears 58a which form the ends of the mounting ring 58 on which the rear housing 30 can turn back and forth over a limited angle such as 45° as permitted by the fixed register pin 59 carried by this ring for extending into an arcuate slot of housing 30 for travel therein.

The barrel 22 has a chamber at the breech for receiving a detachable breech plug 56 for manual insertion into and removal from this breech chamber for operatively positioning a suitably primed powder charge carried in cartridge case 23. The barrel has a bore 27 for carrying the projectile fastener or stud 1 mounted with captivation in a suitable piston 2 so that the fastener will be driven through the barrel when the cartridge 23 is fired by release of a firing pin 34 housing in rear assembly 19.

This assembly 19 includes not only the hollow grip 20 carrying the rear housing 30, the breech block 37 and the pin 34, but also includes the firing pin biasing spring 35, the breech block return spring 38 and the trigger 46, as well as its leaf spring 49 for return of the trigger as it is pivoted about the transverse pin 47 also carried by the housing 30. Block 37 which is apertured at 37a for reception and passage of the point of the firing pin, is slidably mounted in a bore of the housing 30 for reciprocating movement limited only by the breech block screw 39, the head of which travels from one end to the opposite end in an axially extending slot 30b of housing 30, thereby preventing relative rotational movement. The firing pin is normally urged forwardly to the extreme defined by the shoulder 30a about the housing bore carrying the pin and its spring in alignment with a continuation of the bore in the surrounding grip 20.

As set forth in greater detail in above noted application Serial No. 355,034, it is necessary to depress the whole housing of the closed tool by a forward thrust because block 37 also carries a rearwardly extending cocking pin 40 for coaction with a firing pin pawl 42 urged to protrude laterally out from the pin by its spring 43. As there explained more fully, this pawl is also adapted to coact with a sear 46a which is adapted to press the pawl back in when the trigger 46 is pulled so that the firing pin can leap forward free of the restraint normally provided by the cocking rod 40. It should be noted that by means of the action of this arrangement, there is made possible control of the tool so that its operation is prevented in the event the tool is not thrust forward fully and/or is directed substantially squarely with respect to the surface into which the fastener 1 is to be driven.

For a tool with the above noted arrangement of parts, this invention involves not only a first new and improved safety means including various abutments coacting at the muzzle of the barrel 22 for arresting an explosive projected fastener, such as the stud 1, in coaction with first abutment means on the braking piston in the form of cylindrical piston 2, but also involves a second new and improved safety means in the form of a lock for preventing full telescoping action between the barrel and the housing, thereby preventing release of the firing pin 34 not only in the event the first means is absent but also prevents release when the first means includes an improperly installed part.

The first safety assembly, adapted to be mountable upon the muzzle of the barrel, is a safety assembly housed within the shield tube 70 and its shield 24, which is movably mounted by means of the mounting screw 72 and its nut 73 for rotatable connection at the center of the tube plate 68 with the desired lateral offset from the bore of barrel 22. Both shield 24 and tube 70 are telescopically mounted over the barrel so that the tube 70 telescopes into the open end of the outer tube 54 where it is adapted to abut with the stop and barrel lock release ring 82 at flange 82a of the latter which is a part of the second safety means linking the first for coaction with the second safety means.

Release ring 82 is slidably mounted on the barrel between the split retainer ring 83 and the barrel mounting collar 51.

Also mounted on the barrel as part of the second safety means for coaction with the release tube 82 is a pair of tubular barrel lock segments 80 and 81 each having an inwardly extending lip 84 for coaction with the lock groove 22e on the exterior of the barrel for projection therein under the bias of the annular coiled lock spring 85 unless the separating tubular extension 82b of the release ring inwardly beveled at 87 is interposed between the outer surface of the barrel and the barrel lock segments 80 and 81 as shown in FIGURE 2. In this position, the male surface of extension 82b meets the mating female surfaces of the tubular segments, tapered outwardly at their front ends 88 with wiping self-cleaning action. The barrel lock arrangement also includes the barrel spring 26, which is mounted in compression between the ring and the array of segments held circumferentially by the spring toroid 85. One end of spring 26 abuts flange 82a of the release ring and the other end abuts the exterior flanges 80a and 81a of the segments.

The action of the compression spring 26 keeps the segments normally separated from the tube extension 82b of the release ring as shown in FIGURE 1 in which position the latter is butted up against either the snap-ring retainer 83 or the end of tube 70 and in which the lock segments are butted up against the barrel collar 51. In this position it is apparent from FIGURE 1 that, if either the shield tube 70 or the parts including the shield 24 carried and housed by the tube are missing, the release ring 82 and its extension 82b will be kept separated from the segments 80 and 81 so that the lips 84 are urged to drop into groove 22e whereby the locking mechanism will remain locked and prevent operation of the tool.

The particular arrangement of the locking mechanism comprising the second safety means has the advantage of being self-cleaning because of the wiping action between the segments 80 and 81 and the release extension 82b which occurs because these parts snap into the locked and unlocked positions with each normal operation of the tool, if all the necessary parts are in place. Furthermore, accumulation of combustion of the propellant powder released through barrel ports 22p is greatly reduced by the coaction between the end of the shield tube 70 and the uninterrupted annular end sealing flange 82a. It is notable that the lock has the further advantage of preventing operation of the tool not only when parts associated with the shielded action tube assembly are absent, but also in the event that certain of these parts, particularly those disposed between the muzzle of the barrel 22 and the safety shield 24 and described hereinafter, are installed improperly, as for example, where they are inserted backwards.

The arrester arrangement of this tool comprising the first safety means involves a second abutment means provided by orifice forming jaws and a third abutment means in the form of an annular member spaced ahead of a fourth abutment means on the muzzle so as to adapt this member not only for abutment with the workpiece, but also for movement rearwardly and forwardly with respect to the muzzle while the member at the same time confines a series of jaw segments between it and the muzzle, these being adapted to be longitudinally confined between this member and the barrel. The arrangement thus also includes two or more jaw segments adapted to be put into camming contact between cam-like shoulders on the muzzle and on the annular member for camming a part of the jaw segments radially inwardly to form an orifice large enough to pass at least the front part of the fastener, but small enough to extrude, or at least drag or rake the driving head part of piston 2 associated with the fastener so as to brake the velocity of the fastener and avoid its projection at a dangerous speed.

Carried within the shield carrying tube 70 of the safety action assembly shown in FIGURE 1 is a jaw seating ring 200, forming the annular member or the third abutment means at the muzzle, the retainer spring 201, a jaw retainer ring 202 in which there is coaxially carried in turn a pair of arresting jaws 203 and 204 constituting a second abutment means adapted for mounting at the muzzle of the barrel 22 which is reduced at 122 for receiving the internally and externally flanged retainer ring 202 thereon slidably. Mounted on the tube 70 is any suitable shield 24 for coaction with the work surface 100 and the open front end of housing tube 54. Also mounted on the tube is the shield stopping snap ring 170 for coaction with the inwardly projecting shield stop screw 171 carried in the front housing tube 54, the latter of which is encased in a suitable heat resistant elastomer to form the hand grip 99. Ring 170 and screw 171 releasably retain tube 70 and the parts carried and enclosed by it at the front end of assembly 18. Screw 171 is released with the aid of any crank stick put into turn hole 172 provided for the purpose.

Jaws 203 and 204 are articulated segments of a piston arresting die forming a second abutment means disposed between third abutment means in the form of ring 200 and a fourth abutment means on the barrel adjacent the muzzle as at reduced end 122 of the barrel. These jaws are adapted to be held by their rear end flanges 205 and 206 by ring 202 at the muzzle and to rock between the muzzle and the internal holding flange 207 of the retainer ring 202, the front end of which is beveled at 208 to enable the jaws to rock outwardly easily for the purpose of separating the die orifice inner edges 209 and 210 carried on jaws 203 and 204, respectively. These edges are articulatable into die closing and opening position by reason of the cocking or pivotal action of the jaws about the flanges 205 and 206, thereby forming and unforming the arresting orifice 90. The closed jaws form this orifice and also extend into a passageway including the tapered bore 91 somewhat larger than the barrel bore 27 forming an extension thereof and part of the bore of the tool.

When the tool is thrust forwardly so as to move its parts from the first, or safety position, shown in FIGURE 1 to the ready-to-fire, or second position, shown in FIGURE 2, the orifice 90 is biased to its closed position by the camming and backing action of the encircling jaw seating ring 200. This action occurs as the matingly beveled external edge or nose parts 211 and 213 of the closed segments extend into the tapered bight or cam bore 91 of ring 200. The camming bight is formed with a suitable acute taper, preferably at an included acute cone angle of about 20°, i.e. a taper of about 10°. The outer nose edge 211 and edge 213 of the segments is correspondingly tapered at about 10° for the desired resulting closing action for seizure at the orifice edges 209 and 210 and their entry portions 92 and 93 tapered at about 15° to provide a throat at an included angle of about 30° for gradually stopping the driving piston 2 beginning at its tapered leading edge 5 when the stud 1 exhibits an excessive tendency to run away in free flight as shown in FIGURE 6.

The orifice 90 is of a size capable of passing both the stud 1 and any suitably socketed front end portion such as the rigid extension 3 of the braking piston 2 but is insufficient to pass the rear end piston portion 4 which is readily deformable at least at its side wall surface and is enlarged as compared to the front end or extension 3 from which it is separated by a suitable taper 5 in accordance with the description set forth in co-pending United States patent application Serial No. 851,834, filed November 9, 1959, and now U.S. Patent No. 3,063,054, relating to the piston as an article of manufacture. With suitable modification of the barrel bore, an arresting cylinder of the type shown in co-pending United States patent application Serial No. 736,759, filed May 21, 1958, now U.S. Patent No. 3,060,437, may be used. In any event, the braking member has plastically deformable portion constituting the aforementioned first abutment means for abutting directly with the second abutment means.

The surrounding structure of ring 200 adjacent the tapered bore 91 is relatively massive and strong to provide backing with sufficient radial resistance to separation of the orifice edges 209 and 210 when the stopping action illustrated in FIGURE 6 occurs. As a result the jaw segments 203 and 204 are of relatively simple construction. These number as high as six jaws and as few as the pair of jaws shown, with a critical strength and hardness required only at the front end adjacent the orifice edges 209 and 210 and the opposite bevel surface of the nose portions 211 and 213 of each. The tubular rearwardly extending part of these segments are merely for providing a connection between the orifice forming front part of the segments and the pivot points at retraction flanges 205 and 206. Each parting line between segments is provided with a suitable release relief clearance 212 after the front end of both jaws made of suitable tool steel is heat treated to provide a toughness and hardness preferably of about from 55 to about 60 Rockwell on the C scale. Similarly, the jaw seat ring is made of a suitable tool steel heat treated to provide similar strength, toughness and hardness.

So that the jaws can spring open as soon as possible, ring 200 is provided with an enlargement 96 back of the tapered cam bore 91, large enough to clear the sprung out jaws as shown in FIGURE 7. Ring 200 also has the outlet opening 97 considerably larger than barrel bore 27.

When the tool is put into operation by putting ring 200 against workpiece 100 and thrusting the tool forwardly, as the muzzle of barrel 22 moves toward confining ring 200, the jaw segments 203 and 204 rock according to this invention adjacent their rear end flanges 205 and 206 to roll on the barrel muzzle and as a result are cammed inwardly at their inner edges 209 and 210 by the cam surface at the tapered bight or cam bore 91 of the jaw confining ring 200 acting on the outer bevels 211 and 213, respectively. This action puts the jaws into contact circumferentially and forms the monitoring orifice 90.

In normal operation, the stud 1 is driven through orifice 90 with permissible penetration into the work and the reduced extension 3 of the piston 2 also may pass into the orifice without any mutilation of the piston by the jaws. Under this condition of operation the piston 2 is reusable.

After normal tool operation, the tool is lifted from the work surface and put back into the condition shown in FIGURE 1 where the jaw segments are pulled back and maintained in contiguity with the barrel muzzle, as shown by means of the jaw retainer ring 202 acting through its internal flange 207 on the mating segment flanges 205 and 206 under the rearward bias of retainer spring 201 which is a compression spring one end of which presses rearwardly against external flange 216 of ring 202 while the other end presses forwardly on the seating ring 200 as at its external flange 217.

Seating ring 200 is constrained against the action of spring 201 by internal flange 70a of tube 70 while retainer ring 202 is constrained against it by the segment flanges 205 and 206, abutting with both the internal flange 207 and the barrel at the muzzle reduction 122.

It will be appreciated that this arrangement allows the action shield assembly to be replaced by another taken from any one of a series of such assemblies having various and different types of configurations of the shield structure 24 and that this can be done with a minimum of inconvenience inasmuch as the rings 200 and 202 and the spring 201 can be put into any one of these assemblies together with the jaw segments. It will also be appreciated that this arrangement has the advantage of allowing the safety parts, and particularly the jaw segments, to be uncovered easily and to be made visible in this condition for inspection, after which the parts can be just as easily put back into firing position.

The shield assemblies may be secured in place and removed merely by turning the stop screw 171 by inserting any slender rod such as the shank of a screwdriver in the turn hole 172.

It will further be appreciated that this whole safety arrangement including the shield has the advantage of coacting with the angle fire control feature of the type described in U.S. Patent 2,849,715 of R. J. Kopf.

In the event abnormal operation is encountered so that overtravel has occurred as shown in FIGURE 6, the driving piston 2 is subjected to an extruding action between the jaw edges 209 and 210 so that the fastener 1 is gradually stopped and then is held captive by the tool. The arrangement and size of the parts is, of course, varied to suit each caliber of tool barrel bore so as to accomplish arresting of the fastener and its driving piston without failure of the tool parts. The piston 2 is similarly varied in dimension and physical properties so as to cooperate with the tool for the purpose of stopping the fastener without overstressing the part of the piston connecting it to the rear end of the fastener.

The type of operation illustrated in FIGURE 6 occurs only when the operator inadvertently selects a cartridge 23 which is overcharged or when the workpiece 100 exhibits unexpectedly low resistance to penetration of the fastener. When such unsafe conditions do not exist, neither the deformable taper 5 nor the enlarged end 4 of the piston 2 reach the orifice 90 during explosive driving.

After driving has occurred the tool is readily extricated from the fastener 1 and its releasably carried piston 2 as shown in FIGURE 7. The position of the tool parts illustrated here during extrication are the same in each instance whether or not overpenetration and the resultant deformation of the piston has occurred as shown at 9 and 10 in FIGURE 7, the only difference being that piston 2 is deformed by reason of having cooperated with the monitoring orifice 90 of the jaws to form a safety link between the tool and the about-to-run-away stud. In each instance the jaw segments 203 and 204 swing out sufficiently to clear the piston 2 as permitted by the enlargement 96 of the bore of ring 200 under the rearward bias of retainer spring 201 which is sufficient to drag the jaw segments back off the driven piston 2 to separate it as shown in FIGURE 7 from the tool. The spring constants and relative tapers in the seating ring 200 and at the front end of the segments 203 and 204 are such as to make this action possible. It is notable that the internal taper at cam bore 91 and the mating external taper 211 and also 213 are not as steep as the taper at the die orifice throat at 92 and 93.

In one modification, shown in FIGURE 11, the jaws may be joined to form a ball cage tube 194 and edges 209 and 210 may be replaced by a circumferential series of balls, such as four balls of which balls 307, 308, and 309 are shown, carried in pockets in the front of this cage tube to be held in and cammed inwardly by ring 200.

The camming action on one of the balls 307 is shown in FIGURE 12A where the internal taper at the cam bore 91 of the ring presses the ball in its cross bore 312 from the external taper 313 of the tube 194 until the captive ball 307 protrudes inwardly sufficiently to act on a fastener such as 501, FIGURE 13, through its cylindrical piston 502 by raking enlarged end 504 beginning at the taper 505 as evidenced by the indentations and up-setting at 510 affected by each of the deforming balls. As a result, the about-to-run-away flanged stud 501, shown in FIGURE 13 connected to the piston front end 503 at the threaded socket 506 is held captive. In either normal operation or when braking has occurred, extrication of the braking cylinder 502 from the tool is permitted because of the action shown in FIGURE 12B which occurs because of the hereinbefore described other parts and operation of this type of tool.

Figure 9:
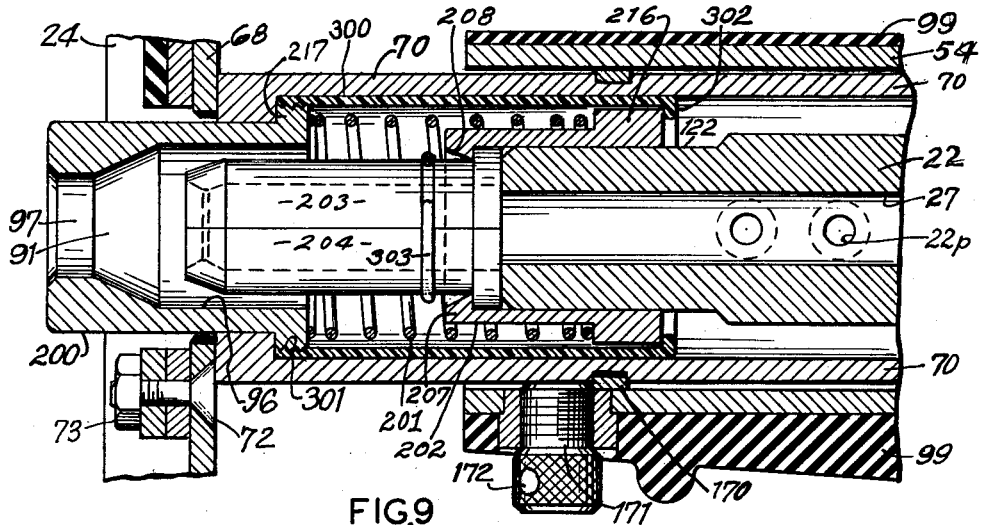
FIG. 9 is a fragmentary view showing the front part of the tool and another embodiment of the safety muzzle fixture of the tool in cross sectional elevation.
Figure 10:
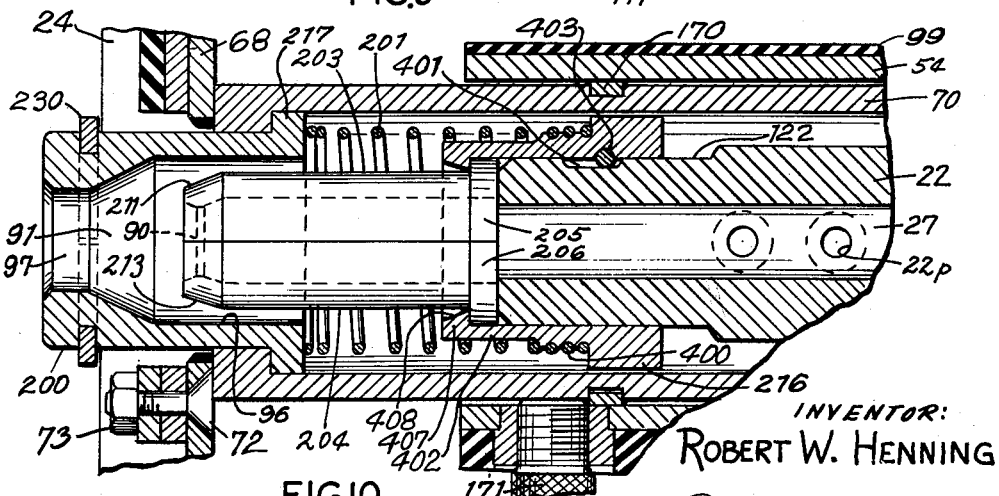
FIG. 10 is a fragmentary view also showing the front part of the tool and still another embodiment of the safety muzzle fixture of the tool of this invention in cross sectional elevation.
Figure 14:
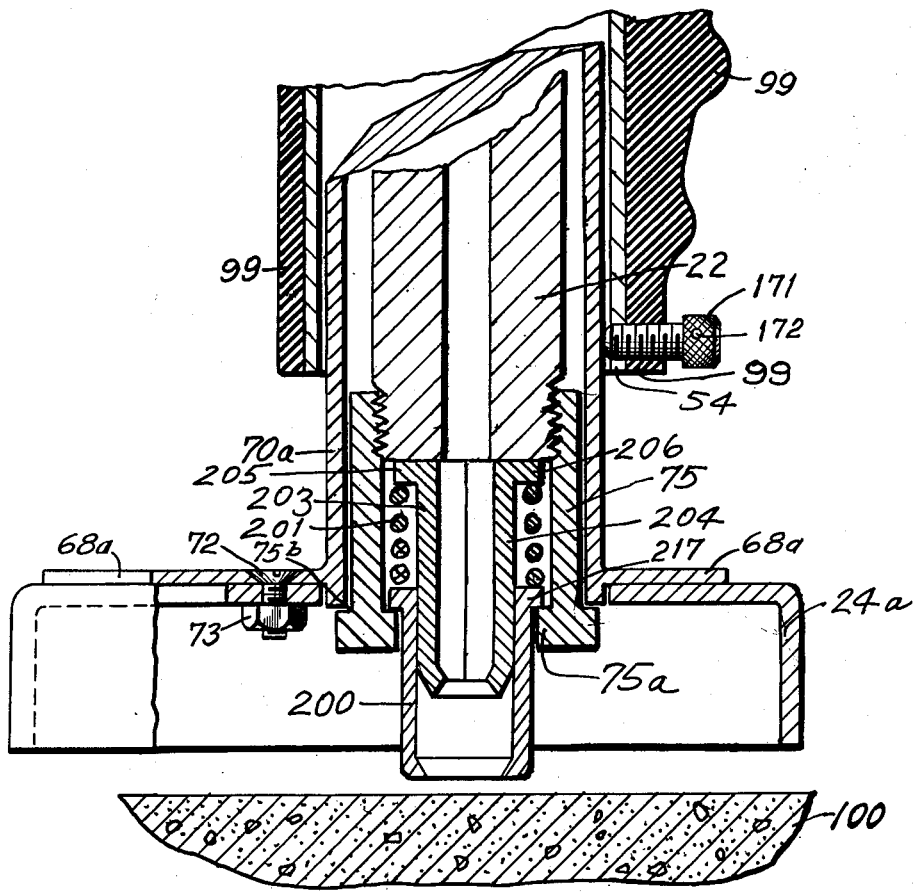
FIGURE 14 is a side view in cross section showing only the front end of a tool further modified to provide a different fixation of the jaws on the tool muzzle.

FIGURES 9 and 10 illustrate embodiments modified so as to maintain the fastener arresting parts with the action tube assembly where it be desirable that these assemblies each carry most of its own arrester arrangement, or to distribute the fastener arrester parts to maintain some with the safety action tube assembly and some with the tool barrel, each leaving the jaws available and/or visible for inspection.

In FIGURE 9, the external rear end flange 217 of the jaw seating ring 200 carries an outer tube 300 slidable within tube 70 and attached at its front end at the threaded connection 301 to this flange. Tube 300 has at its rear end an internal crimp 302 which is for keeping ring 200 together with ring 202, the jaws 203 and 204 retained on 202 with the aid of the elastic O-ring or rubber band 303, and with the retainer spring 201, all together as a unit separable from the rest of the tool as well as from the fixture assembly carrying the shield 24 on the fixture tube 70. Jaws 203 and 204, if desired, can be pulled free and replaced. Tube 300 is preferably made of a transparent plastic such as methylmethacrylate, polystyrene, or the like to facilitate inspection.

FIGURE 10 illustrates how the jaw seating ring 200 can be provided with an external snap ring 230 adjacent its front end and spaced forwardly sufficiently from the rear flange 217 to permit the necessary reciprocating movement longitudinally while at the same time retaining this ring as a part of the shield fixture assembly. It will be appreciated that a snap ring 230 can be provided on the jaw seating ring 200 of the arrangement of FIGURE 9 thereby making all the arrester parts a part of the shield fixture assembly.

According to the modification of FIGURE 10, there is included not only the snap ring 230, but also a releasable connection between retainer spring 201 and the retainer ring 402 whereby the end of this helical compression spring is threaded into external helical grooves 400 formed on the ring. For the purpose of keeping jaws 203 and 204, their retainer ring 402 and their retainer spring 201 in assembly with the tool barrel muzzle 122, there is provided a longitudinal slot 401 in the muzzle 122 extending crosswise for reception of the transversely extending drift pin 403 carried by the ring 402 for reciprocating movement in the slot 401 to the extent sufficient to enable the jaw segments 203 and 204 to move forward a bit for snug seating in ring 200 and to rock and roll on the barrel with sufficient movement to spread the orifice edges 209 and 210 enough to release the driving piston 2 for extrication from the tool and thereafter to pull the jaws together again for retention together and against the muzzle as shown in FIGURE 10 when the tool is in relaxed condition between operations. The retainer ring has flange 407 beveled at 408.

The essential arrester elements then are the orifice segments 209 and 210 carried by jaws such as 203 and 204, the jaw seating annular member 200 and the barrel 22 together with some means such as the tube 70, its flange 70a, the snap ring 170, and the stop screw 171 for limiting the forward movement of the jaw seating ring 200 with respect to the muzzle of the barrel.

It will be appreciated that modifications of this basic arrangement can be made to provide the necessary reciprocating action between the ring 200 and the barrel muzzle to operate the orifice forming jaw segments. For example, the muzzle can be externally threaded to take, instead of retainer ring 202, a nut member 75 having an internal flange 75a at its front end to take the place of shoulder 70a for grasping the seating ring flange 217 disposed back of it between flange 75a and the barrel muzzle with longitudinal spacing to allow the necessary reciprocation. With this modification modified shield 24a and the tube plate 68a and tube 70a carrying the shield by mounting screw 72 and nut 73 may be adapted to abut with the rearwardly facing shoulder 75b of the muzzle nut for retaining the tubed shield assembly on the tool with the tube between the barrel 22 and the housing tube 54, very much like the arrangement shown in aforementioned Serial No. 355,034, filed May 14, 1953, with the difference that (a) screw 171, having turn hole 172, acts on the polygonal tube 70a to hold shield 24a in an adjustable angular position against free rotation and that (b) the forwardly extending peripheral skirt of the shield 24a must be correspondingly increased in its longitudinal extension and enclosed blast chamber volume to provide a peripheral edge for contacting the workpiece 100 in substantially the same plane as the front end of the seating ring 200 instead of the front of the nut member.

All arrangements also preferably include a spring such as 201 for urging ring 200 ahead of the jaw segments and for retaining the jaw segments in abutment with the muzzle of the barrel, thereby adapting the segments for withdrawal from the jaw closing cam bore 91 of the ring and to enable the orifice edges 209 and 210 to spread apart to permit the driving head of piston 2 to pass through as shown in FIGURE 7.

With suitable modification, spring 201, if volute wound on the flat having adjacent turns rubbing to form a short frusto conical spring pile, may butt against the jaw flanges 205 and 206 directly. In order to obtain a greater length of this spring 201 and some telescoping action with the segments 203 and 204 there is provided some sort of retainer ring such as 202 or 402, respectively, externally flanged at 216 or grooved at 400 at the rear for abutment with the rear end of the spring 201 and also flanged internally at 207 or 407 for abutment with the jaw flanges 205 and 206.

As shown rotated into view in FIGURES 1 and 2, the tool barrel 22 also carries in its side a piston retainer such as ball check 107 (shown rotated about the barrel bore axis by 90° to bring it into view) pressed inwardly by any suitable means such as a compressed rubber insert 108 carried in the recess of the seating mounting 109 preferably screw threadedly mounted in the barrel in the event replacement is necessary. Ball check 107 protrudes inwardly from an aperture in the barrel bore to bear on the side wall of the driving piston enlargement 4 for more positively holding the stud-piston assembly before firing adjacent the breech plug 56 and the explosive powder cartridge 23.

The ogival point of the stud 1 is preferably sheathed in a flanged cap of tip 12 or the type shown in co-pending U.S. patent application Serial No. 601,212, filed July 31, 1956, for improving barrel travel, penetration and holding power of the stud, now abandoned.

It will be understood that the tool of this invention is especially adapted for projection of any suitable driving unit comprising a fastener such as the stud 1 and a driving piston such as 2 characterized by a deformable peripheral portion and some suitable means of forming a releasable grip between the fastener and the driving piston. In any event, the peripheral cylindrical portion of the enlarged trailing end 4 of the piston 2 is of a deformable character for coaction with the orifice forming edges of the jaw segments or the equivalent thereof.

In addition to the embodiments described hereinbefore, it will be understood that other modifications and variations may occur to those skilled in the art without departing from the spirit and scope of the invention as set forth in the appended claims.

What is claimed is:

1. An explosive actuated tool for driving a fastener having a workpiece penetrating front end, comprising barrel means providing a bore along the axis thereof having a discharge end at the muzzle thereof and adapted for operation of said tool so that an explosive powder charge can propel a drivable unit therethrough, said drivable unit including a piston member adapted in said operation to move along said bore, said piston member having a front end adapted for gripping the rear end of said fastener releasably and having a peripherally surrounding side portion of a plastically deformable character forming thereon a first abutment means, said tool in part being movable between an actuating position when thrust against the workpiece axially and an inactive position when not so thrust, a second abutment means mounted at said muzzle on said tool for movement into an operative coaxial position in the path of said side portion of said first abutment means for gradually stopping said drivable unit adjacent said muzzle with said penetrating front end of the fastener having traveled beyond said end not in excess of a predetermined distance beyond said muzzle for workpiece penetration, and for movement alternatively into an inoperative position of said second abutment means out of said path, a third abutment means mounted with limited axial movability on said tool separate from said second abutment means, said third abutment means being positioned coaxially about at least a portion of said second means and axially for interposition between said workpiece and second abutment means, fourth abutment means at said muzzle, said second abutment means consisting of a plurality of jaw segments adapted to be mounted between said third and fourth abutment means with said segments cockable at an angle with respect to the barrel axis to said inoperative position and adapted to be put into abutment with both said third and fourth abutment means and thereby pivoted to said operative coaxial position when said tool is in said actuating position with said second abutment means held compressed between said third and fourth abutment means, said abutted second, third and fourth abutment means being axially arranged to permit said tool in part being moved to said actuating position and responsive to moving said tool in part to said actuating position for simultaneously moving and holding said second abutment means in said operative coaxial position, resilient means between said second and third abutment means acting on said second abutment means to urge said segments less cocked into said operative coaxial position and acting on said third abutment means to urge said third abutment means forwardly with respect to said second and fourth abutment means, and means on said tool for connecting said third abutment means to said barrel means with limited axial motion.

2. An explosive actuated tool for driving a fastener having a workpiece penetrating front end comprising barrel means providing a bore along the axis thereof having a discharge end at the muzzle thereof and adapted for operation of said tool so that an explosive powder charge can propel a drivable unit therethrough, said drivable unit including a piston member adapted in said operation to move along said bore, said piston member having a front end adapted for gripping the rear end of said fastener releasably and having a peripherally surrounding side portion of a plastically deformable character forming thereon a first abutment means, a second abutment means mounted at said muzzle on said tool for movement into an operative coaxial position in the path of said side portion of said first abutment means for gradually stopping said drivable unit adjacent said muzzle with said penetrating front end of the fastener having traveled beyond said end not in excess of a predetermined distance beyond said muzzle for workpiece penetration, and for movement alternatively into an inoperative position of said second abutment means out of said path, a third abutment means mounted with limited axial movability on said tool separate from said second abutment means, said third abutment means being positioned coaxially about at least a portion of said second means and axially for interposition between said workpiece and second abutment means, said tool in part being movable relative to said barrel means, second and third abutment means between an actuating position when thrust axially against said workpiece and an inactive position when not so thrust, said third abutment means being responsive to moving said tool to said actuating position for simultaneously moving said second means into its operative coaxial position, said second means comprising a circumferential array of jaw segments interposed between said muzzle and third abutment means for limited radial pivotal movement into circumferential contiguity substantially with each other at said operative coaxial position and with said muzzle and third abutment means when said tool is moved to said actuating position with said segments held, and out of said contiguity at said inoperative position, biasing means adapted to urge said jaw segments against said muzzle to pivot to said operative position and urge said third abutment means from said segments to permit pivoting to said inoperative position, said third abutment means, segments held in contiguity and barrel means being abutted in that order in said actuating position, said third means being adapted to constrain said segments and biasing means adjacent said muzzle, and means mounted on said tool for retaining said third means thereon.

3. The tool of claim 2 wherein the combined axial length of the abutted third abutment means and the jaw segments when properly installed coaxially with the second abutment means partially telescoped into said third abutment means at said operative coaxial position provides a predetermined spacing between the work and muzzle at said tool actuating position, but a spacing in excess thereof when improperly installed, and including means responsive to said spacing for permitting tool movement to said actuating position at said predetermined spacing and preventing said movement in the absence thereof.

4. A tool for driving into a workpiece a steel pin, bolt or like penetrating fastener assembled with a lengthy piston as a drivable unit and comprising an elongated barrel having a muzzle end and a breech end, said muzzle end of said barrel being adapted to be thrust toward said workpiece during driving of said fastener, said barrel being provided with a longitudinal bore extending therethrough to form a passageway for reception of said unit and a chamber at the breech for reception of an explosive motivating cartridge, a housing having an elongated portion extending forwardly therefrom adapted to surround said barrel in coaxially spaced relationship, a firing pin movably carried within the housing, means for supporting said pin rearwardly of said barrel, means for cocking said pin as said housing is moved forward with respect to said barrel, said housing being longitudinally movable relative to said thrust barrel toward and away from the muzzle end thereof respectively into a forward telescoped ready-to-fire position at which the tool is held thrust against the workpiece and into an extended safety position at which the tool and its pin are inoperative, a guard member having a sleeve portion surrounding said muzzle end and received in said elongated portion, a plurality of jaws radially disposed and extending as an extension between said muzzle end of said thrust barrel and said workpiece, said jaws being adapted at one end to move radially inwardly to define a circular central extrusion orifice small enough to pass only part of the length of said unit, a jaw camming ring adapted to confine said jaws sufficiently loosely to permit said jaws to pivot outwardly out of said orifice defining relationship to make a unit passing opening and adapted to pivoting said jaws inwardly into said relationship under the impetus of said thrust, a compression spring one end of which is in abutment with said ring and the other end of which is in abutment with said jaws to move said ring and jaws apart out of said confining pivoted relationship in the absence of said thrust, said sleeve portion extending about said jaws, ring and spring for retaining them in operative relationship radially and longitudinally with respect to the barrel bore, said orifice being of a size permitting free passage of the portion of said normally penetrating portion of said fastener whereat said jaws extend inwardly into the path of the outward periphery of at least the trailing end of said piston for preventing free passage of at least said normally non-penetrating trailing end when said tool is maintained thrust into said ready-to-fire position, and said jaws when pivoted outwardly moving out of said path permitting extrication of the tool from at least said driven fastener of said unit from said bore when said tool is moved to said safety position, and means in said housing interposed between said elongated portion, said barrel, and sleeve portion and inoperable in the presence of said guard member to prevent movement of said housing relative to the front end of said barrel for cocking said firing pin, but operable to prevent such movement in the absence of said guard member.

5. A fastener driving powder charge actuated tool comprising a powder charge firing means including a pin and firing pin spring, a barrel for receiving said powder charge, said barrel having a bore and a barrel muzzle, means mounting said barrel and said firing means for endwise relative movement between a normal first safety position and a second ready-to-fire position with said barrel and firing means in said respective positions spaced apart and adjacent each other, said housing and at least the muzzle of said barrel being mounted for axial relative movement between said first position wherein said housing is spaced farther from said muzzle and said second position with said housing is spaced closer to said muzzle, means responsive to movement from said first to said second positions for moving said pin to cock said firing pin, a tube telescopically mounted over said barrel and having a workpiece engageable portion adapted for location near said muzzle for axial relative movement between said barrel and housing, said workpiece engageable portion extending laterally outwardly from the barrel bore generally flush with said muzzle in said second position with the tool barrel bore generally perpendicular to the surface of said workpiece, barrel engageable latching means in the form of a series of separate axially and radially movable barrel gripper segments and an axially movable stop ring, said ring and segments being mounted on said barrel intermediate said tube and a portion of said housing, said segments forming axial female surfaces the leading ends of which are tapered outwardly and said segments being in circumferential arrangement, said segments having inward latching and outward unlatching positions, means for biasing said segments radially inward into said barrel latching position, said ring having a tubular extension extending toward said segments and forming a complementary male surface the leading end of which is tapered inwardly to mate with the tapered leading ends of said segments, resilient compression means mounted about said barrel between said stop ring and arrangement of segments, one end of said compression means being in abutment with said stop ring and the opposite end being in abutment with said circumferential arrangement of segments, whereby the male surface of said stop ring extension is normally kept out of engagement with said female surfaces to allow said gripper segments to be biased inwardly, first stop means for retaining said stop ring on said barrel against the thrust of said compression means, a second stop means acting between said housing and said tube for holding said tube in said housing for abutment with said stop ring and movement inwardly against the forward thrust of said compression means, whereby movement of said housing toward said second position moves said stop ring against said tube and the thrust of said compression means to adapt said male surface to engage with said female surfaces thereby moving said latching means outwardly to said unlatching position for enabling the second position to be reached.

6. The tool of claim 5 wherein the means for biasing the segments inwardly comprises an annularly continuous coiled spring.

7. In an expanding gas operated stud driving tool, a substantially uniformly bored tool barrel and a tool housing axially movable relative to said barrel between an extending safety position at which the tool is inoperative and a telescoped ready-to-fire position at which the tool is adapted, when held thrust against a workpiece, to be operative for ejecting said stud through the bore of the barrel at a velocity adapted to effect a predetermined penetration of said stud into said workpiece beyond the muzzle of the barrel, a normally reusable stud driving cylinder adapted to be slidably received in said bore, said bore being of a length adapted for receiving not only said cylinder but also said stud assembled in tandem for driving them as a unit until said velocity is reached, said cylinder being plastically deformable at least around its rear end and recessed at the opposite end and having a diameter at least at said rear end snugly fitting said bore in slidable relationship, said cylinder having a diameter along its length larger than the largest transverse dimension of said stud, said recess being adaptable for reception of the rear end of said stud in ultimately detachable relationship, a plurality of jaws radially disposed and adapted at one end to move radially inward to define a circular central extrusion orifice, said jaws being disposed at said muzzle to form an extension of said muzzle, a jaw camming ring adapted to confine said jaws at least loosely to permit said jaws to pivot outwardly out of said opening defining relationship in the absence of said thrust and adapted for pivoting said jaws inwardly into said relationship under the impetus of said thrust, a jaw ring spring to move said jaws out of said confining pivoted relationship in the absence of said thrust, and coaxial means mounted about said barrel, jaws, spring and cam ring for retaining them in operative relationship radially and longitudinally on the barrel with respect to the bore thereof, said orifice being of a size permitting free passage of said stud whereat said jaws extend inwardly into the path of the outward periphery of said cylinder for preventing free passage of at least the rear end of said cylinder when said tool housing and jaws have been moved to said operative position, thereby effecting at least a plastic deformation of said cylinder at said periphery by said jaws and gradual stopping of said unit upon movement beyond said penetration and thereafter permitting movement of said jaws out of said path to permit removal of said cylinder through said muzzle from said bore when said housing is moved toward safety position as the tool is lifted from said workpiece.

8. The tool of claim 7 wherein the jaws, spring and cam ring and retaining means are coaxially arranged and axially movable with respect to the barrel.

9. The tool of claim 7 wherein the jaws are Z-shaped to include an inwardly extending orifice segment and an outwardly extending release arm, and wherein said return spring is disposed between said arms and the camming ring, said ring having a forwardly facing shoulder for abutment with the coaxial retaining means and a rearwardly facing shoulder for abutment with said spring.

10. A tool for driving into a workpiece a steel pin, bolt or like penetrating fastener detachably assembled with the front end of a lengthy plastically deformable piston as a drivable unit and comprising an elongated barrel having a muzzle end and a breech end, said muzzle end of said barrel being adapted to be thrust toward said workpiece during driving of said fastener, said barrel being provided with a longitudinal bore extending therethrough to form a passageway for reception of said unit and a chamber at said breech end for reception of an explosive motivating cartridge, a housing having an elongated portion extending forwardly therefrom adapted to surround said barrel in coaxially spaced relationship, a firing pin movably carried within the housing, means for supporting said pin rearwardly of said barrel, means for cocking said pin as said housing is moved forward with respect to said barrel, said housing being longitudinally movable relative to said thrust barrel toward and away from the muzzle end thereof respectively into a forward telescoped ready-to-fire position at which the tool is held thrust against the workpiece and into an extended safety position at which the tool and its pin are inoperative, a guard member having a sleeve portion surrounding said muzzle end and received in said elongated portion, a muzzle ring adapted to be put into abutment with said workpiece, a plurality of separate jaws radially disposed and adapted to form an extension between said muzzle end of said barrel and said muzzle ring, said jaws being adapted at their front ends to move radially inward to define a circular central extrusion orifice small enough to pass only part of the length of said unit, said ring having a bore with a jaw camming surface disposed between said front ends and workpiece adapted to confine said jaws sufficiently loosely in said extended tool position to permit said jaws to pivot outwardly of said orifice defining relationship to make a unit passing opening and adapted to pivot said jaws inwardly into said relationship under the impetus of said thrust, a compression spring, one end of which is in abutment with said ring and the other end of which is adapted to exert a force on said jaws to move said ring and jaws apart out of said confining pivoted relationship in the absence of said thrust, said sleeve portion extending about said jaws, ring and spring for retaining them in operative relationship radially and longitudinally with respect to the barrel bore and muzzle end, said orifice being of a size permitting free passage of the portion of said fastener whereat said jaws extend inwardly into the path of the outward periphery of at least the trailing end of said piston for deformation thereof, thereby preventing free passage of at least said normally non-penetrating trailing end when said tool is maintained thrust into said ready-to-fire position, and said jaws when pivoted outwardly moving out of said path permitting extrication of the tool for at least said driven fastener of said unit from said bore when said tool is moved to said extended safety position.

11. The tool of claim 10 including a jaw retaining ring, the front end of which is internally flanged and the rear end of which is externally flanged for abutment with the spring, said flanges being axially spaced, and wherein the rear end of each of said jaws is externally flanged, the front surface of said jaw flanges being in abutment with a rear surface of said internal flange for transmitting the spring force to said jaws.

12. The tool of claim 11 wherein the barrel muzzle end forms a reduced extension and wherein the retainer ring is telescopingly mounted thereon.

13. The tool of claim 11 wherein the front face of the internal flange of the ring is beveled outwardly to facilitate outward pivoting of the jaws for opening the orifice.

14. The tool of claim 11 including a retention means and wherein the muzzle ring is retained by said means on the guard member with limited axial movement to permit the jaws to be pivoted into and out of the orifice defining relationship.

15. The tool of claim 11 including retention means and wherein the retaining ring is retained by said means on the muzzle end of the barrel with limited axial movement to permit the jaws to be pivoted into and out of the orifice defining relationship.

16. The tool of claim 11 wherein the muzzle ring and retainer ring are slidably connected together with limited axial movement by a confining sleeve having end connections with said rings, said movement being sufficient to permit the jaws to be pivoted into and out of the orifice defining relationship.

17. The tool of claim 16 wherein the confining sleeve is threadedly connected at one of its ends to one said sleeve for detachability and is inwardly flanged at the other.

18. The tool of claim 10 wherein the jaw camming surface of the muzzle ring is a taper forwardly converging at an included angle of about 20° and wherein the exterior of the front ends of each of the jaws has a complementary bevel of about 10°.

19. The tool of claim 10 including a jaw retaining ring the front end of which is internally flanged and wherein the rear end of each of the jaws is externally flanged for abutment with said internal flange and the muzzle end of the barrel and wherein the other end of the compression spring is fixed to said retaining ring for transmitting the spring force to said jaws.

20. The tool of claim 10 wherein the jaw camming surface is a taper and the front end of each jaw has a complementary bevel.

21. An explosive powder actuated tool including a barrel having a bore adapted when said tool is thrust against a workpiece for driving toward its muzzle a unit including a fastener with a forwardly projecting workpiece penetrating portion and a lengthy piston the front end of which has a releasable connection with the fastener and at least the circumferential periphery of at least the rear end of which is plastically deformable, said tool including a housing operatively connected with said barrel and mounted thereon for axial relative movement and including said piston and piston abutment means mounted separably on said barrel at said muzzle including piston deforming balls for movement into an operative position in the path of said periphery for gradually stopping said unit when said penetrating portion emerges a predetermined distance beyond said muzzle and into an inoperative position out of said path after driving to permit separation of said unit from said tool, and axially movable second abutment means mounted on said tool coaxially about said first means for moving said balls into one of said positions in response to said relative movement.

22. The tool of claim 21 wherein the piston abutment means is a tubular cylinder having openings for retaining the balls and wherein the second abutment means has a shoulder for moving said balls.

23. The tool of claim 22 wherein the openings terminate externally in a converging bevel at one end and the shoulder is a corresponding internal taper at one end.

24. The tool of claim 1 wherein the second abutment means, resilient means, and third abutment means take the form of (1) a plurality of jaw segments adapted at one end to pivot radially on the discharge end of the barrel means, (2) a spring and (3) a cam ring, respectively, coaxially arranged with respect to each other and axially movable with respect to the barrel means, and wherein said barrel means has threadedly mounted thereon in axially captive coaxial relationship an annular retainer for said jaw segments, spring, and cam ring, said retainer acting as the means on the tool for connecting said third abutment means to said barrel means with limited axial motion.

25. The tool of claim 24 including at the bore discharge end, a guard member positioned movably about the retainer for axial movement and mounted by said retainer providing axial limitation of said guard member movement.

References Cited in the file of this patent

UNITED STATES PATENTS

| | | |
|---|---|---|
| 2,518,395 | Sopris | Aug. 8, 1950 |
| 2,622,243 | Temple et al. | Dec. 23, 1952 |
| 2,855,817 | Kopf | Oct. 14, 1958 |
| 2,869,127 | Williams | Jan. 20, 1959 |
| 2,887,925 | Kopf | May 26, 1959 |
| 2,925,602 | Kopf et al. | Feb. 23, 1960 |
| 2,930,042 | Temple et al. | Mar. 29, 1960 |
| 2,945,236 | Kopf et al. | July 19, 1960 |

FOREIGN PATENTS

| | | |
|---|---|---|
| 999,148 | France | Oct. 3, 1951 |